Aug. 6, 1946.                S. W. SEELEY                2,405,238
                        POSITION DETERMINING SYSTEM
                Filed April 13, 1940          6 Sheets-Sheet 1

Inventor
Stuart W. Seeley

Aug. 6, 1946.  S. W. SEELEY  2,405,238
POSITION DETERMINING SYSTEM
Filed April 13, 1940  6 Sheets-Sheet 3

FIG. 4.

FREQUENCY COUNTER

DIFFERENTIATOR

Inventor
Stuart W. Seeley
By
Attorney

Aug. 6, 1946. S. W. SEELEY 2,405,238
POSITION DETERMINING SYSTEM
Filed April 13, 1940 6 Sheets-Sheet 4

*FIG. 7.*

SAW TOOTH DISCHARGE TUBE

*FIG. 8.*

PHASE SPLITTER

*FIG. 9.*

PULSE SELECTOR

*FIG. 10.*

Inventor
Stuart W. Seeley

Attorney

Aug. 6, 1946.  S. W. SEELEY  2,405,238
POSITION DETERMINING SYSTEM
Filed April 13, 1940  6 Sheets-Sheet 5

Fig. 11.

CLIPPER TUBE

Fig. 12.

KEYING TUBE

PHASE REVERSER & CLIPPER

Inventor
Stuart W. Seeley
By
Attorney

FIG. 15. TIME DELAY NETWORK

FIG. 16. COMMUTATOR

FIG. 17. IMPULSE TRANSMITTER

Inventor
Stuart W. Seeley
By
Attorney

Patented Aug. 6, 1946

2,405,238

UNITED STATES PATENT OFFICE 2,405,238

POSITION DETERMINING SYSTEM

Stuart W. Seeley, Roslyn, N. Y., assignor to Radio Corporation of America, a corporation of Delaware Application April 13, 1940, Serial No. 329,434

15 Claims. (Cl. 250—1)

This invention relates to a system and method for accurately determining the instantaneous position of a movable object with respect to one or more reference points whose locations are known. More particularly, it relates to a radio control system whereby a movable object may be guided directly to the location of a predetermined objective.

By the term "movable object" is herein meant any aircraft, ship, submarine, motor vehicle or the like. The invention is particularly useful for directing the flight of an airplane to a position directly above a predetermined objective such as an airport, city, crossroad, bridge, or the like, and such a particular application will be herein described, although it is to be understood that the invention is nowise limited to the particular arrangement described.

Aircraft position locating systems are known in which directional bearings of two or more ground stations are successively, or simultaneously taken from an airplane. By drawing lines on a map having angles which correspond to the bearings of known ground stations and which pass through the points on the map corresponding to the location of the ground stations, the position of the airplane may be determined by the point at which the lines intersect. Systems are also known by means of which such bearings are automatically taken and recorded so as to provide a continuous indication of the location of the airplane with respect to predetermined ground stations. Such directional bearings, however, are subject to substantial errors due to "night effect" and other causes, as is well known. It is the principal object of this invention to provide a position determining system for movable objects which is free from the errors of the known systems and which is sufficiently accurate to indicate the location of the object with respect to a given point or points within an error of a few hundred feet, even where the reference points or ground stations are several hundred miles distant. Another object of this invention is to accomplish the foregoing result in such a manner as to provide the navigator, or an aircraft, for example, with a continuous visual or semipictorial indication of his distance from the known control points, and from a third point which is to be the objective of his flight.

A further object of this invention is to accomplish the foregoing results in such a manner that the system is substantially free from interference due to static and other electrical disturbances, and likewise substantially free from interference by other transmissions. At the same time, the nature of the transmission is such that it preserves substantially complete secrecy, thus making it impossible for unauthorized listeners to utilize any signals radiated from the airplane or the control station which may be intercepted.

A further object of the present invention is to provide a system which is not dependent for its operation upon the relative amplitudes of the transmitted or received signals but merely upon the presence or absence of a signal. So far as is known most of the systems of the prior art operate in conjunction with overlapping directional fields which are alternately keyed, the "on course" indication being a function of the relative amplitudes of the two fields. The position indicators of the prior art generally utilize directional loop antennas for the successive determination of the bearing of the airplane with respect to two or more ground stations. The present system differs from the known prior art in that it depends for its operation upon the invariable velocity of propagation of radiant energy. As a result, the accuracy of the present system exceeds that of all known prior systems.

A still further object of this invention is to provide a position determining system for airplanes and the like, in which the distance from the airplane to two or more ground stations is accurately determined, as distinguished from known systems in which the angular bearing of the ground station is determined.

A still further object of this invention is to provide a visual indicator for airplanes, and the like, which may be preset to guide the plane to a predetermined objective, the indicator being provided with an objective index and one or more variable indexes which correspond to the position of the plane at any time. The airplane is then guided along a path which causes the variable index or indexes to approach the objective index, and finally to coincide therewith. At such time the pilot of the airplane knows that he has reached his objective and may then prepare to land or accomplish any other mission which has been assigned to him.

A still further object of this invention is to provide a simple, adjacent, easily installed, and substantially fool-proof form of guiding or position finding system by means of which it is possible to locate the position of an aircraft in space in a plane which is either parallel to or normal to the surface of the earth, as well as to determine the instantaneous location in space of an aircraft, or the like, relative to a predetermined or selected objective.

The foregoing and other objects of this invention are accomplished by a system in which a plurality of ground stations are provided, which for convenience are herein termed the "primary control station" and the "secondary control station." The locations of these control stations are fixed relative to each other and are accurately known. The control stations may be located at permanent installations, or they may be located in trucks or other vehicles so as to be movable to any locations as conditions change. The control stations may even be located in balloons suspended above the earth at predetermined locations and heights, or the control stations may be located in ships at sea whose positions are accurately known. Still further the control stations may even be located beneath the surface of the earth or beneath the water, or any combination of the above may be used. It is to be understood, however, the locations of the control stations remain fixed during any given flight.

The equipment which is utilized at each control station includes means for reradiating a pulse of radio frequency energy. The term "reradiate" is intended to include reflection as well as actual reception and retransmission. The preferred arrangement consists of a receiver and a transmitter. The receiver operates to receive the radio frequency transmissions from the guided aircraft. It is connected to the transmitter, and modulates the same, which reradiates the received wave at a slightly different radio frequency. In order to distinguish one ground station from another the transmitter frequencies at each station are different. The equipment required on the movable object includes a pair of receivers responsive to the ground station transmitters and a transmitter of the impulse type which is well known in the art. Such a transmitter radiates an extremely short pulse of radio frequency energy, the duration of the pulse being considerably less than the time required for the wave of radiant energy to travel from the aircraft to the ground station and return to the aircraft. By measuring the time required for each impulse to be radiated from the airplane and received again, the actual distance of the aircraft from each of the control stations may be determined. It will be appreciated that this information is all that is necessary to determine the position of the aircraft with respect to the two ground stations. In the case of the indicator system herein described, it is not necessary for the pilot to make any calculations in flying to a predetermined objective, while at the same time, his distance from the control stations and from the objective is continuously visually indicated.

This invention will be better understood from the following description when considered in connection with the accompanying drawings and its scope is indicated by the appended claims.

Referring to the drawings.

Figure 1:
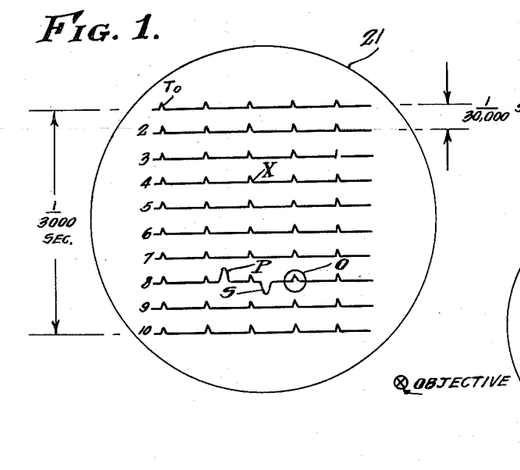
Figure 1 is a sketch indicating the cathode ray indicator located in the movable object.

The present invention has a wide variety of applications, other than the embodiment herein illustrated. It should be clearly understood, therefore, that any assumptions made are only for the purpose of illustration and are not intended in any manner to limit the scope of the present invention. Referring to Fig. 1, the viewing screen 21 of a cathode ray tube is illustrated. By suitable apparatus which will be hereinafter described, a series of ten horizontal lines are traced across the face of the screen by suitably deflecting the electron beam. The general nature of the beam deflection is such that it is caused to move horizontally from left to right at a uniform rate in a given time and then to return from right to left in a very much shorter time to begin tracing the second horizontal line in a similar manner. In each case the return time of the beam is made as rapid as possible, and the time required for returning the beam to its starting position is usually of the order of 2 percent of the time required to trace one line. In this manner the beam successively traces the ten horizontal lines moving in each case from left to right in a time, which for the sake of illustration, may be assumed to be $\frac{1}{30,000}$ of a second. At the same time the beam deflects vertically, in steps or linearly with respect to time, so as to move the beam from the first line to the tenth line in a period approximately equal to $\frac{1}{3,000}$ of a second. As before, the beam is returned from the bottom of the screen to its initial position very rapidly so that substantially no time is lost between the completion of the tenth line and the start of the first line.

It will be appreciated that the beam traces ten complete lines, or one frame at the rate of 3,000 frames per second. Since a radio wave is known to travel at the rate of 300,000,000 meters per second, it will be appreciated that a pulse of radio energy will travel a distance of 10,000 meters through space during the time required for the beam to trace each horizontal line. If it now be assumed that the several line traces produced by the cathode ray beam upon the luminescent viewing target 21 of the cathode ray tube cover an area of approximately 4 inches square, it will at once become evident that during the time the cathode ray beam has moved along one line of the screen a distance of 1 inch, a radio wave will travel approximately 2500 meters through space. It is realized that this figure is only approximate, since it does not take into consideration the small period of time required for the return of the cathode ray beam. In order to simplify the explanation, however, this return time will be neglected, but it is to be understood that actual calculations utilizing this instrument must include a consideration of the return time.

Figure 1A:
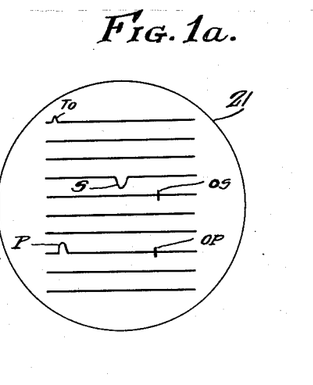
Figure 1a is a sketch similar to Figure 1.
Figure 2:
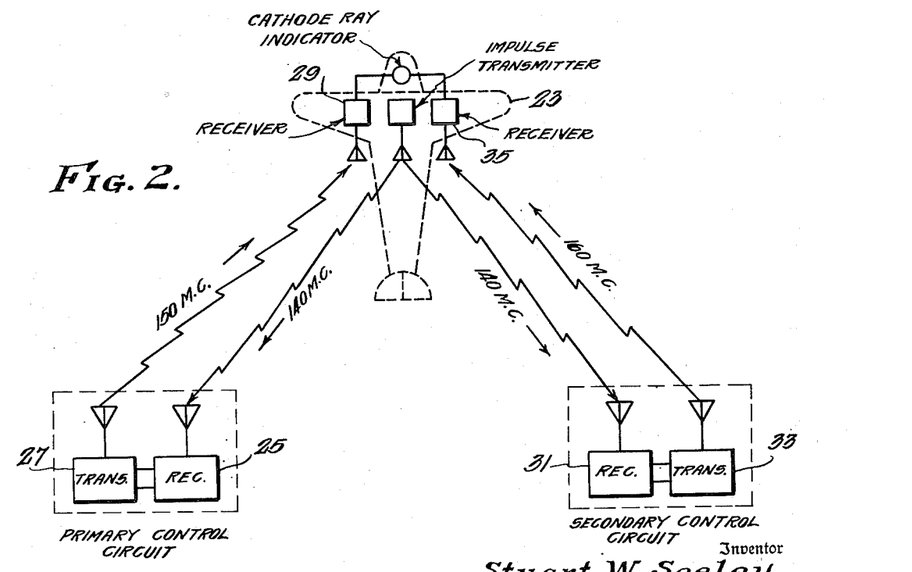
Figure 2 is a sketch illustrating the general system.

In accordance with the basic conception of this invention a short pulse of radio energy is transmitted from the aircraft at a time $T_0$. This impulse is utilized to initiate the scanning cycle of the cathode ray beam. Thus, the left hand end of the first scanning line corresponds to the time $T_0$ at which the first impulse is radiated. Referring now to Figs. 1a and 2, it will be seen that the impulse travels from the aircraft 23, is received by the receiver 25 at the primary control station, reradiated from the transmitter 27 and received back at the aircraft on a receiver 29. The received impulse is then applied to the cathode ray screen so as to produce a small upward deflection P in the scanning beam or to vary its intensity in accordance with well known practice. The elapsed time is, of course, a measure of the total distance through which the impulse has traveled, plus some fixed time intervals which are a function of the circuit characteristics of the receivers and transmitters utilized and which may be accurately predetermined. During this elapsed time the cathode ray beam has traversed a number of horizontal line traces and is, for example, traversing the eighth line at the instant the received impulse deflects the cathode ray beam to form a position index mark P.

At the same time the transmitted impulse will be received by the receiver 31 of the secondary control station, reradiated on a different frequency by transmitter 33 and received again by the receiver 35 which is located on the aircraft. The resultant impulse is also utilized to deflect the cathode ray beam in a vertical direction, but in order to distinguish this impulse from the one previously received it may be phased so that it deflects the beam downwardly to produce the position index S illustrated in Fig. 1a. It has been assumed in this instance that the aircraft is at the particular moment slightly nearer the secondary control station than the primary control station, so that the position index S from the latter station is received before the position index P has been received from the primary control station.

It thus becomes apparent that the distance of the aircraft from the two control stations may be determined by measuring the position of the impulses P and S along the scanning lines. Specific objects of this invention, however, make possible a far more accurate determination than would be possible by the suggested measurement, and in addition, a system is provided by means of which the pilot may fly to a predetermined objective without having to actually measure the position of the received position index pulses along the scanning lines, or to make any calculations whatsoever. In accordance with this modification of the invention a pair of objective indexes OP and OS are provided which represent the destination of the aircraft. That is, the pilot is merely required to fly the aircraft until the variable position indexes P and S coincide with the respective objective index, at which time he knows that he has reached his objective and is within a few hundred yards of his destination.

Before the aircraft takes off for any given flight to reach a particular destination it is, of course, necessary to calculate the time distance of the objective from each of the given control stations. Now the time distance from the objective to the primary control station is not necessarily equal to the time distance from the objective to the secondary control station. Nor is it desirable to provide two objective indexes corresponding to the two separate distances, since the pilot must then align the position index P with the objective index OP, and also align the position index S with the corresponding objective index OS. While such a system is entirely practical, it has the disadvantage that it is necessary to align two variable index marks with two fixed index marks which may be and usually are located at different points on the cathode ray screen. Accordingly, a preferred system is herein provided by means of which only one objective index is required even though the distance from the objective to the primary control station differs considerably from the distance to the secondary control station.

The preferred method of providing the fixed objective index will now be described. It will be apparent that the time distance from the primary control station to the objective can readily be calculated, taking into consideration the known delays of the equipment. Assuming that the objective is further from the primary control station than from the secondary control station, the time distance from the primary control station is first determined. It is apparent that a mark could be placed over the scanning line corresponding to the calculated time distance. This would not produce a very accurate determination, however, since any change in the position of the lines would cause a corresponding error. It is desirable, therefore, to include the objective index in the scanning line itself by suitably deflecting the cathode ray beam to provide a mark at the instant corresponding to the precalculated time distance. One method of accomplishing this is to delay a pulse initiated at the time the radiated pulse was transmitted by a period equal to the calculated time distance. This, however, would require a time delay network of proportions which would be prohibitive in an aircraft. Consequently, provision is made for deriving a pulse which occurs a known interval after the transmission of the radiated pulse, the known interval being approximately the desired time distance. This approximate timing pulse may then be corrected and utilized to provide the objective index marker. Alternatively a series of fixed timing indexes may be provided, one of the timing indexes being selected as the objective index by suitable marking and the exact calibration effected by shifting the time relation of the radiated impulse with respect to the timing impulses or vice versa. The latter arrangement is preferred and is described hereinafter.

Each line of Fig. 1 is seen to be divided into five equal time periods by means of small index marks which occur at regular time intervals and which represent successive time periods of $1/150,000$ second. These timing indexes not only make possible more accurate measurements along the line in case the system is to be used for the calculation of the distance of the aircraft from two control stations, but also are the source of the objective index which was referred to above.

In accordance with the preferred system, assuming the calculated time distance falls between the 38th and 39th timing index, in the 8th line, the timing index which is the first to occur after the calculated time distance, i. e., number 39, is marked by means of a suitable mark O which may be placed upon the glass face of the cathode ray screen. In order to calibrate the device for distances intermediate the times represented by successive marking impulses, the transmitted impulse itself is then delayed by a calculated amount so that the received impulse coincides with the selected marking index O at the calculated time.

It now becomes necessary to consider the fact that the calculated time distance from the objective to the secondary control station is not necessarily the same as that from the objective to the primary control station. In this case a second impulse is radiated from the aircraft transmitter at a subsequent time which is so calculated that it will arrive back at the receiver at the same instant that the first transmitted impulse returns from the primary control station when the aircraft is directly over its objective. This is accomplished by utilizing one of the indexing impulses to generate a second transmitted impulse at a known time interval after the transmission of the first impulse to the primary control station. For example, the indexing impulse X appearing at the time interval represented by its location on the fourth scanning line is selected and utilized to release an impulse from the aircraft transmitter. As before, corrections for time intervals less than the period between successive timing index pulses may be made by delaying the transmission of the pulse corresponding to the selected timing pulses by an amount equal to the desired correction.

It will now be appreciated that it is necessary to provide means for preventing the first impulse from deflecting the cathode ray after retransmission by the secondary control station and for preventing the subsequent impulse from deflecting the cathode ray after retransmission by the primary control station. If this were not done, four impulses would be observed on the cathode ray screen instead of two since the pulse first to be transmitted to the primary control station would also be repeated back from the secondary control station. Likewise, the second transmitted pulse would be repeated back from both control stations. Consequently, it is proposed to synchronously commutate the two receivers and the circuit connecting the successive modulating impulses to the transmitter at a rate which is relatively small with respect to the time being measured so that one or more pulses are sent to and received from the primary control station and then for a successive interval one or more pulses are sent to and received from the secondary control station. The rate of commutation, however, is preferably sufficient to provide persistence of vision on the cathode ray screen so that both pulses are apparently simultaneously received.

Before taking up the discussion of the particular apparatus and accomplishing the above described results, it is desirable to consider means for extending the range of the device beyond that which would be attained by the time interval represented by the ten scanning lines. Since the scanning pattern is repeated successively at a rate of 3,000 complete frames of ten lines each per second, it will be appreciated that if the distance from the aircraft to either control station is sufficiently great, i. e., in excess of 100,000 meters, the retransmitted impulse will not arrive during the first scanning period. That is, if the position index P were to appear on the first scanning line this might indicate either that the aircraft was very near the primary control station or at such a distance that the received impulse was not in fact on the first scanning line but on the eleventh scanning line which coincides therewith. In order to ascertain in which complete scanning frame the received impulse has been received a system has been provided which permits the selection of any one of ten complete frames. That is, when the aircraft is within a certain distance of the control station the instrument will be adjusted so that only the first scanning frame will be applied to the cathode ray screen, the following nine scanning frames being suppressed. This selecting mechanism is also provided with means for definitely determining which one of the group of ten frames is being viewed.

The objective index O may, for example, occur during the fifth scanning frame if the distance from the primary control station to the objective is sufficiently great. The pilot, however, being desirous of indicating his approximate distance from the control station at all times, will first select the first scanning frame and follow the position index P representing his distance from the primary control station along the various lines of the first scanning frame. As his distance increases the point P will move off the right-hand end of the tenth line and will no longer appear until he operates the selector mechanism and applies the second scanning frame to the cathode ray indicator. The variable index P will then appear on the first scanning line and will move successively down to the tenth line as his distance from the primary control station increases. This process will then be continued until he reaches the general vicinity of the objective, at which time the objective index O in the fifth scanning frame will appear.

Since it is desirable to simultaneously indicate the distance of the aircraft from the secondary control station, it is preferable to follow a course which is generally equi-distant from the two control stations. The pilot will thus be able to observe his relative position with respect to the two control stations at all times. However, this will not always be the case, since as pointed out above, separately timed pulses are radiated for the two control stations to compensate for the difference in distance between the objective and the control stations. If the discrepancy is great enough, it may be necessary to alternately select one scanning frame and then the other in order to check his relative distance from the two control stations. Alternatively during the initial part of the flight, it may be desirable to radiate but a single pulse and receive it from both control stations simultaneously in order to provide a more accurate indication of his general position with respect to the control stations. One switch is provided for effectively removing the commutator 115, and another switch is provided for disconnecting the second modulating impulse from the transmitter. Suitable switching arrangements to accomplish this are provided. Upon approaching the objective the double impulse system may then be switched in so that the single objective index, properly compensated for the relative distances to the two control stations, is utilized.

A specific embodiment of this invention will now be described by referring to Fig. 3 which illustrates in block diagram form the apparatus which is installed in the aircraft to accomplish the above-described results.

Figure 4:
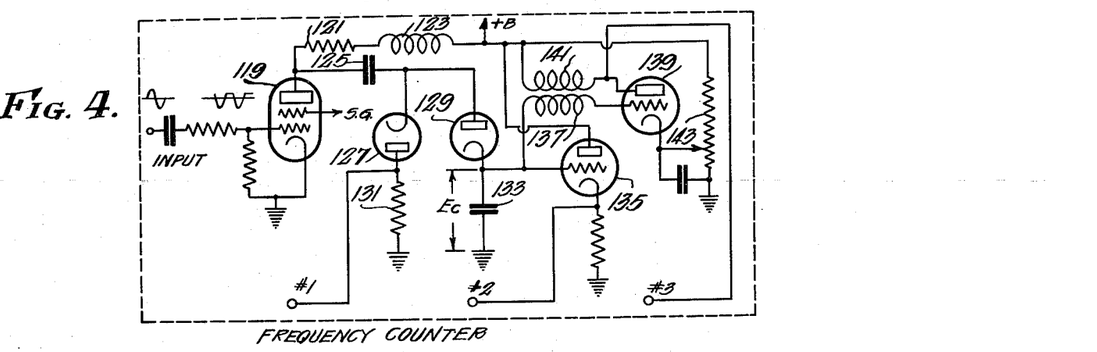
Figure 4 is the wiring diagram of a frequency counter.

Reference numeral 36 indicates an oscillator, the frequency of which is accurately maintained at a constant value which, for the sake of illustration, is assumed to be 150 kc. The accuracy of the instrument depends directly upon the stability of this oscillator, and it should, therefore, be suitably controlled by means of a piezo-electric element or the like. The oscillator output is applied to the control element of a counter 37 which may be a device similar to that described in British Patent 471,731, of December 4, 1935, which effectively divides the oscillator frequency to one-fifth its previous value somewhat in the manner of a multivibrator. The difference between the counter and a multivibrator is essentially that the latter has an oscillatory period of its own while the former responds only to some predetermined fraction of the frequency of the applied voltage. The actual circuit of the counter 37 is illustrated in Fig. 4 which will be described hereinafter. It will be noted that three output terminals are provided. These output terminals make available voltage impulses of varying characteristics which are indicated by the curves shown immediately adjacent the conductors which are connected to the three terminals.

Figure 6:
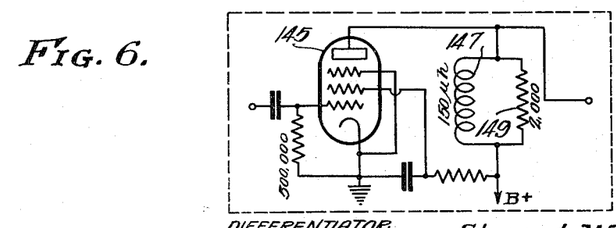
Figure 6 is a wiring diagram of differentiator.
Figure 7:
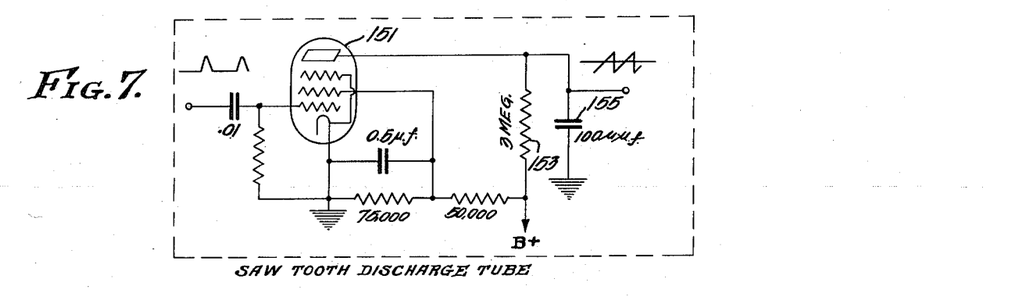
Figure 7 is the circuit of a saw-tooth discharge tube.

The number 3 terminal, hereinafter described, provides a series of impulses which occur at one-fifth the frequency of the oscillator 36, that is, the time between successive impulses is equal to $1/30,000$ of a second. These impulses are applied to a differentiator 39, the function of which is to decrease the duration of each impulse so that it will more accurately determine the operating time of a saw-tooth discharge tube which is represented by reference numeral 41. The differentiator circuit is illustrated in Fig. 6 and is hereinafter described. The saw-tooth discharge tube is illustrated in Fig. 7, and provides a saw-tooth output voltage in the well-known manner. This voltage is applied to a phase splitter 43 illustrated in detail in Fig. 8 which provides as its output balanced saw-tooth voltages for energizing a push-pull deflection amplifier 45, which is a conventional amplifier, the output of which is connected between the horizontal deflecting electrodes of a cathode ray tube 47.

The number 3 output terminal of the five-to-one counter 37 is also connected to the control input circuit of a similar 10-to-1 counter indicated by reference numeral 49. The No. 2 output terminal of the counter 49 is a step voltage of the type indicated by the small curves adjacent connecting lead 51 which applies the output voltage of the counter 49 to an amplifier 53. The amplifier is connected to one of the vertical deflecting electrodes of the cathode ray tube 47. As a result, a vertical deflecting potential is applied to the tube 47 which increases in ten equal steps, each step occurring at a time interval of $1/30,000$ of a second. The complete cycle of ten steps is obviously accomplished in a time interval of $1/3,000$ of a second. As a result, the cathode ray beam is caused to move horizontally across the luminescent screen in $1/30,000$ of a second at which time it is returned to its original starting point but one line lower, and the second line is then scanned. Alternatively, the vertical deflecting voltage may be derived from a saw-tooth discharge tube which produces a deflecting voltage similar to that applied to the horizontal deflecting electrodes, but in such a case the lines will not be horizontal but will slope downwardly, as is well known.

The No. 1 output terminal of the 5-to-1 counter 37 is connected to a phase reversing amplifier 55 the output of which is a unipotential voltage comprising a series of pulses separated by intervals of $1/150,000$ of a second. The phase reversing amplifier is merely a conventional amplifier, and its purpose is to invert the negative impulses which are produced by the counter 37 so that they will have the proper polarity. The output of the amplifier 55 is connected by means of a switch 57 to the remaining vertical deflecting electrode of the cathode ray tube 47. As a result, small marks or timing index pulses are produced along the ten scanning lines as indicated in Fig. 1. Since these impulses are derived directly from the main oscillator 36 their timing is extremely accurate.

It has been pointed out above that a complete scanning cycle comprises ten complete frames each of which in turn contain ten horizontal scanning lines. It has also been pointed out that the first transmitted impulse is derived from the first timing pulse of the first line and the first frame. This impulse is indicated in Fig. 1 by the first impulse in the first line which occurs at time To. It will be appreciated, therefore, that it will be necessary to select one particular pulse from the large number of pulses which occur during the period and use it to initiate the scanning cycle as well as to time the transmitted pulse. It will also be appreciated that but one pulse should be radiated during the period covered by the complete scanning cycle of ten frames. In order to accomplish this, the No. 3 output of the counter 49 is connected to the control input of a similar 10-to-1 counter 58. The No. 2 output terminal of the counter 58 then provides a step voltage of the type illustrated by the small diagram adjacent connecting lead 59. This voltage increases in ten equal steps from a given starting point and then suddenly returns to the original point at a time interval which is equal to $1/300,000$ of a second. The 300 cycle step voltage which is so obtained is applied to the input of a differentiator and a clipper tube 61 the circuit of which is illustrated in Fig. 6. The function of this tube is to produce a positive impulse corresponding to the return time of the step voltage, the frequency of the impulses being, as a result, 300 cycles per second. The output of the differentiator and clipper is connected to the No. 2 input terminal of a keying tube 63 which is illustrated in detail in Fig. 12. The phase reversing amplifier 55 is connected to the No. 1 input of the keying tube 63.

The function of the keying tube is to pass current only at such time as there is present on its input circuits a positive impulse from the phase reversing amplifier and a similar impulse from the differentiator 61. Since the 3 kc. counter 49 supplies the vertical deflecting voltage for the cathode ray tube 47, it will be recognized that the impulse derived from the step output of the 0.3 kc. counter 58 occurs at the instant the cathode ray beam has completed its entire scanning cycle of ten complete frames. Consequently, the resulting impulse which is produced by the differentiator 61 is concurrent with the No. 1 impulse of the scanning cycle. The circuit constants are adjusted so that the duration of the derived impulse is short enough to exclude the No. 2 input which occurs $1/150,000$ of a second later.

Figure 14:
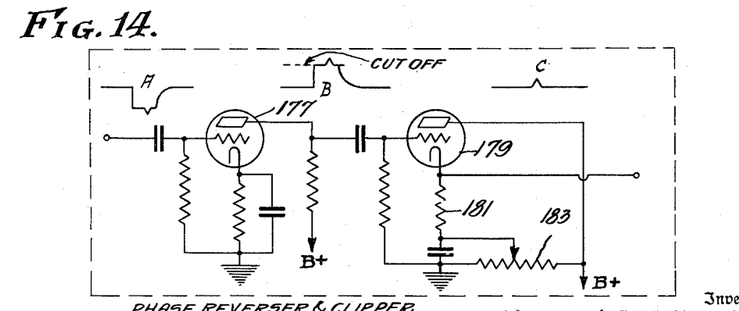
Figure 14 is the circuit diagram of a phase reverser and clipper.

The output of the keying tube is a negative impulse having a small peak corresponding to the selected timing impulse. This impulse is applied to a reverser and clipper tube 65 the circuit of which is illustrated in detail in Fig. 14. The function of this tube is to eliminate the low frequency keying impulse and to obtain only the selected timing impulse as illustrated in the small curve adjacent the reverser and clipper tube 65. The output of this tube is then applied to a delay network 67 which may be, for example, of the series inductance-shunt capacitance type illustrated in Fig. 15. The delay network is designed to have a total time shift at least equal to the time period between adjacent timing impulses. This period is approximately equal to 1/150,000 of a second or 7 microseconds. The delay network is preferably made adjustable, and is calibrated in terms of the total delay produced. By suitably adjusting the delay network, the time of transmission of the radiated impulse with respect to the time at which the scanning cycle is initiated is adjusted so that the calibrated time distance from the primary control station to the objective, based on the total path of transmission and the known constant delay, will coincide with one of the timing impulses in the desired frame which most nearly corresponds to the objective distance.

The output of the time delay network 67 is applied to an ultra high frequency transmitter 69 through a commutator device 71. The transmitter itself is an impulse transmitter and may, for example, be of the type illustrated in Fig. 17. The commutator 71 may be mechanically or electrically operated, as desired, and preferably takes the form illustrated in Fig. 16. The function of the commutator 71 is to apply the selected control impulse to modulate the impulse transmitter 69 in alternation with other control impulses which are utilized in a manner which will hereinafter be described.

Figure 9:
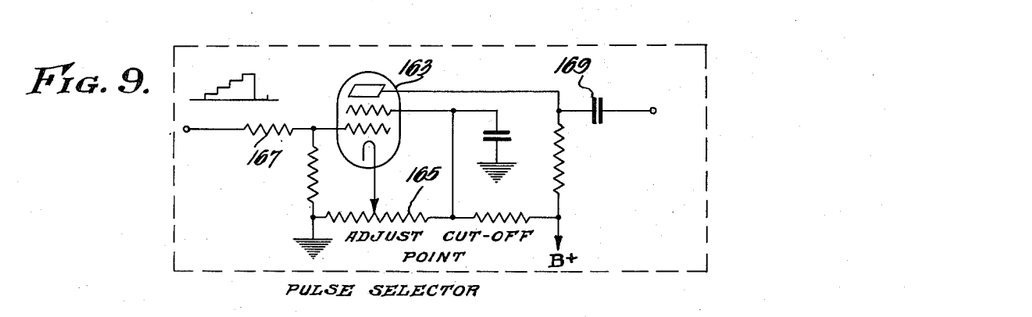
Figure 9 is the circuit diagram of a pulse selector.
Figure 11:
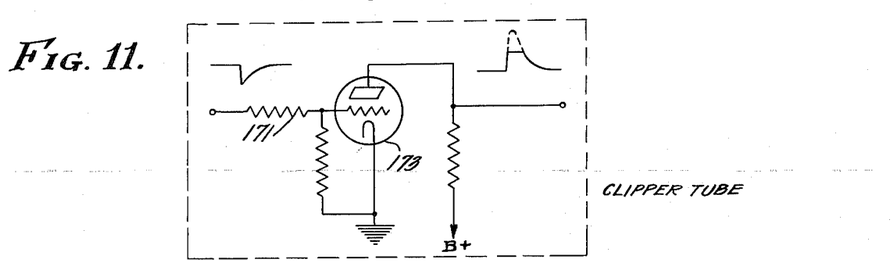
Figure 11 is the circuit diagram of a clipper tube.

As indicated above, it is impractical to obtain the impulse which is to be used to key the transmitter to radiate a wave to the secondary control station by delaying the initial selected impulse, since the required delay period would be excessive. It, therefore, becomes necessary to select another particular timing pulse which may occur in any line of any of the ten frames. Assuming that it is desired to select impulse X from line 4 of the first frame, as indicated in Fig. 1, a selector system is required by means of which it is possible to select, first, the first, second, third, fourth, or fifth timing impulse, the third being selected in the present example, then to select the particular scanning line in which the desired impulse lies, that is, the fourth, and finally to select the one of the ten frames in which the desired pulse occurs. The first portion of this selector system comprises a pulse selector 73 the output of which is connected to the No. 2 output terminal of the 30 kc. counter 37. The circuit diagram of a suitable pulse selector is illustrated in Fig. 9, which will be later described. The function of the pulse selector is to derive a short pulse whose duration includes the interval between successive steps of the 30 kc. step voltage produced by counter 37. The pulse selector is provided with a manual adjustment by means of which any one of the five steps may be selected at will. The impulse which is so derived is passed through a limiter or clipper tube 75 the circuit diagram of which is illustrated in Fig. 11. The function of this tube is to produce an essentially square positive impulse the time duration of which includes one of the five equal steps of the 30 kc. voltage, and, consequently, it will be appreciated that this impulse coincides with every fifth timing impulse. However, this square impulse is not of sufficient accuracy to utilize by itself, so that it is necessary to combine it with a timing impulse from the phase reversing amplifier 55 in a keying tube 77 similar to that discussed previously. The output of the keying tube is applied to a phase reverser and clipper tube 79 which removes the control and passes only the selected timing impulse. There is thus obtained at the output of the reverser and clipper 79 an accurately timed short impulse which corresponds in time with every fifth timing impulse, and which may be made to coincide with the initiating impulse, or with any desired successive impulse by means of the pulse selector 73.

A similar system is utilized to select the desired line of the scanning frame; that is, a second line selector 81 is connected to the No. 2 or step voltage output of the 3 kc. counter 49. The line selector 81 is connected to a third keying tube 83 through a clipper tube 85. The operation of these elements is identical to that of the corresponding elements described immediately above. In this case, however, the line selector is adjusted to select the desired one of ten steps, rather than one of five, as in the preceding case. As before, the control impulse from the line selector is of insufficient accuracy to be utilized alone, so that it is combined with the selected pulse from the reverser and clipper 79 in keying tube 83 the output of which is again passed through a reverser and clipper 87 which removes the control impulse and permits only the accurately timed impulse to pass. By suitably adjusting the line selector 81, it is, therefore, possible to obtain an impulse which corresponds in time to the selected impulse X but which is repeated during each of the ten scanning frames which constitute a complete scanning cycle. The final step, consequently, is to select the desired frame period, and this is accomplished, as before, by a frame selector 89 which is coupled to the No. 2 output of the 0.3 kc. counter 58. The output of the frame selector is connected to a fourth keying tube 91 through a clipper tube 93, the output of the keying tube being connected, as before, to a reverser and clipper tube 95 which in turn applies the selected pulse to a delay network 97. The output of the delay network is applied to the commutator 71 and is, accordingly, applied to control the transmitter 69 along with the first derived impulse from delay network 67 at alternate intervals.

The selector system so far described thus makes it possible to select any one of the 500 timing pulses which occur during each complete scanning cycle. Thus, it is possible to select the desired frame, the desired scanning line of the frame, and the particular pulse in the selected line. In practice, the device is adjusted to direct the aircraft to a particular objective by determining the time distance from the primary ground station to the objective, assuming that this distance is longer than the distance from the secondary control station to the objective. Assume that the time-distance from the primary ground station to the objective is less than indicated by the indexing pulse O of Fig. 1 and greater than the next preceding or 38th indexing pulse. The time-distance difference between the indexing pulse O and the actual time-distance is obtained by delaying the first transmitted pulse an amount sufficient to compensate for the said time-distance difference and for any other compensation required. Next determine the time-distance from the secondary ground station to the objective. Use the indexing pulse O to represent the objective and measure from O towards To a time-distance equal to the time-distance from the secondary ground station to the objective to determine the nearest timing impulse. This particular impulse is then selected by adjusting the selecting system, is compensated by the adjustable delay network 97 (if compensation is required) and is utilized to initiate the second impulse from the transmitter which is received and retransmitted by the secondary ground station. The received pulses are indicated as P and S. As the aircraft or other vehicle is directed toward the objective, the indications P and S approach the index O. When the indications P and S coincide with the index O, the coincident indications show that aircraft should be at the objective.

It is apparent that some system must be provided for indicating which of the various pulses, lines and frames have in fact been selected. Such an indicator is provided by an auxiliary cathode ray tube 99 which may be a small 2-inch tube, or the like. The 300 cycle step wave output of the 0.3 kc. counter 58 is applied to the vertical deflecting electrode of the auxiliary cathode ray tube 99. The 3000 cycle step wave output of the 3.0 kc. counter 49 is applied to the horizontal deflecting electrode. Consequently, a series of ten lines is produced similar to the ten lines of the main cathode ray tube 47. The No. 2 output of the 0.3 kc. counter 58 is also applied to another frame selector 101, which is identical to those previously described. Its output is connected, as usual, through a clipper tube 103 which in turn is coupled to the control grid 105 of the cathode ray tube 47. This control grid is normally given a negative bias so that the cathode ray beam is extinguished until such time as a positive impulse is applied from the output of the clipper tube 103. The time duration of this impulse corresponds to the time period required to complete one scanning frame; that is, 1/3000 of a second. Consequently, the cathode ray screen remains dark during a period corresponding to nine scanning frames.

The output of the clipper 103 is also applied to a phase reverser 107 which in turn is coupled to the control grid of the auxiliary cathode ray tube 99. This control grid is normally biased so that the cathode ray beam is operative, but, due to the phase reverser 107 when an impulse is applied to the main cathode ray tube to produce a frame, the same impulse is applied to the auxiliary cathode ray tube to extinguish it for a corresponding period. Now the vertical scanning period is 1/300 of a second. If an impulse of 1/3000 of a second is applied to bias off the tube, it is apparent that one of the ten lines will be removed. It will, therefore, be an easy matter to count the remaining lines in order to determine which line has been selected. The number of the line selected, as indicated on the auxiliary cathode ray tube, corresponds to the frame which is applied to the main cathode ray tube 47; that is, if an observation of the auxiliary cathode ray tube indicates that the third line is missing, it may be established that the frame selector 101 has been adjusted to select the third frame. The operation of the line and pulse selectors may be checked by utilizing switch 57 which in its "check position" connects the finally selected keying impulse from the output of the reverser and clipper 95 to one of the vertical deflecting electrodes, while removing the superimposed timing impulses. It is apparent that the position of the selected impulse should coincide with the position of one of the timing impulses on the cathode ray screen. Thus, by operating the switch 57, noting the position of the single selected impulse which will appear in the "check position", and returning the switch to its normal position, the line and number of the selected pulse may be determined.

The two receivers 109 and 111 are also included in the aircraft equipment. These receivers may be separate or they may have a common input and antenna system broadly tuned to include signals from both of the control station transmitters. The output of the first receiver 109 is connected through a phase reverser 113 to a commutator 115. The output of the second receiver 111 is connected directly to the commutator 115. The commutator is synchronously operated from a commutator control voltage source 117 with the commutator 71. As a result, the outputs of the first and second receivers are alternately connected to one of the vertical deflecting plates of the cathode ray tube 47. As pointed out above, this permits the signals from the two ground stations to be alternately received. The phase reverser 113 inverts the phase of the voltage from one of the receivers so that the variable indexing impulse S, for example, may be distinguished from the variable indexing impulse P.

I have thus described the general system by means of which a preferred embodiment of my invention may be carried into practice. As to the specific details of the various elements which have been schematically indicated in Fig. 3, it is to be understood that there are many different systems which may be utilized. However, in order to fully describe an operative system, an illustrative embodiment of each of the elements which are not well known to those skilled in the art will now be described.

Figure 5:
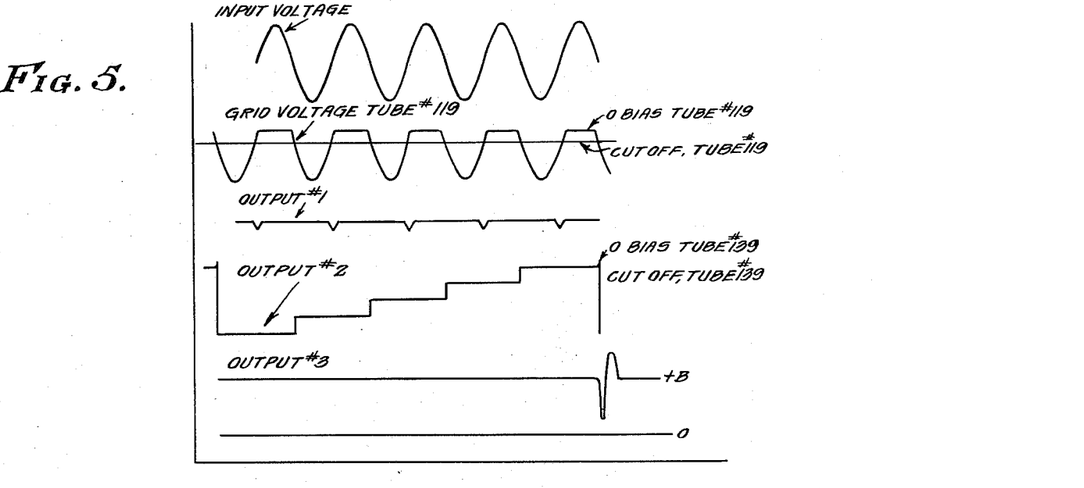
Figure 5 is an explanatory diagram relating to the operation of the frequency counter.

Referring to Figs. 4 and 5, I have illustrated a frequency counter of the type described in the British Patent 471,731, previously mentioned. Sine wave input is applied through a limiting resistor to the grid of a tube 119, the plate circuit of which is energized from a suitable source of D.-C. voltage through a resistor 121 and a peaking inductor 123. The plate is also coupled through a small capacitor 125 to the cathode of a diode rectifier 127 and the anode of a second diode rectifier 129.

The anode of the first diode rectifier 127 is connected to output terminal No. 1 and is also connected to ground through a resistor 131. The cathode of diode 129 is connected to ground through a large capacitor 133, to the grid of a cathode follower tube 135, and through an inductor 137 to the grid of an output tube 139. Output terminal No. 2 of the frequency counter is connected to the cathode of the cathode follower tube 135. Output terminal No. 3 is connected to the anode of the output tube 139. The output circuit of this tube also includes an inductor 141 which is coupled so as to produce a regenerative feedback to the grid circuit inductor 137. A positive bias is applied to the cathode of the output tube 139 by means of a voltage divider 143.

Input tube 119 is normally drawing plate current. As its grid becomes negative during each cycle of applied voltage, its plate voltage becomes more positive, thus causing a small constant charging current to flow through capacitor 125 and diode 129 into capacitor 133. The capacity of capacitor 125 is quite small with respect to that of the capacitor 133 so that the total charge received by the latter capacitor is not sufficient to charge the capacitor up to its full capacity. The voltage across the large capacitor 133 consequently takes the form of the step wave illustrated in Fig. 5. A similar output voltage is then applied to output terminal No. 2 by means of the cathode follower tube 135.

When the applied voltage causes the grid of the input tube to become positive, the plate voltage decreases, as is well known. This causes a negative pulse to be applied to the cathode of the diode 127 and current flows through resistor 131, producing a negative pulse at output terminal No. 2, as illustrated in Fig. 5. A similar negative pulse is produced each time the grid exceeds the cut-off value of the input tube. However, during this interval, capacitor 133 maintains its charge, since it is now isolated by rectifier 129. As a result, each reversal of the applied voltage causes the charge in the capacitor 133 to be increased until finally at some predetermined voltage the negative bias which is normally applied to the output tube 139 is overcome. When this occurs, the beginning plate current produces a regenerative feedback voltage on the grid which accelerates the tube to plate current saturation in very rapid time. Grid current flows in the output tube and rapidly discharges capacitor 133, at which point the charging cycle begins again. The voltage appearing at output terminal No. 3 consists of a rapid negative pulse corresponding to maximum plate current followed by a small reactive positive pulse. It will be appreciated that, when plate saturation is reached, the phase of the feedback voltage is reversed. The grid of the output tube rapidly becomes more negative and control by the fixed negative bias is reestablished. The point at which the condenser 133 is discharged is determined by the adjustment of the voltage divider 143.

To operate as a 5-to-1 frequency counter, the fixed bias applied to output tube is adjusted to a value sufficient to cause the tube to become triggered at the fifth step, as indicated in Fig. 5. In order to operate as a 10-to-1 frequency counter, it is merely necessary to increase the fixed bias which is applied to the output tube so that it will be triggered into action when the tenth charging impulse is applied to capacitor 133.

Fig. 6 is a differentiator which is merely an amplifier in which the input capacitance and grid resistance are so selected that the amplifier tube 145 responds to rapid changes in the potential of the applied voltage. In order to prevent the high frequency components of the applied pulses from being attenuated, the plate circuit of the amplifier includes a compensating reactor 147 connected in shunt with a resistor 149.

The saw-tooth discharge tube illustrated in Fig. 7 includes a capacitance-resistance input coupling system and a thermionic tube 151, the plate circuit of which is energized by a source of D.-C. potential through a high resistance 155. A small capacitor 155 is connected across the plate circuit resistor 153. In operation, the capacitor 155 is slowly charged through resistor 153 at a rate which is substantially linear over a small range. At predetermined intervals, determined by the applied impulses, the anode-cathode impedance of the tube 151 becomes very low and discharges the condenser. The saw-tooth output voltage which is produced is illustrated in the small curve directly above the output terminal.

Figure 8:
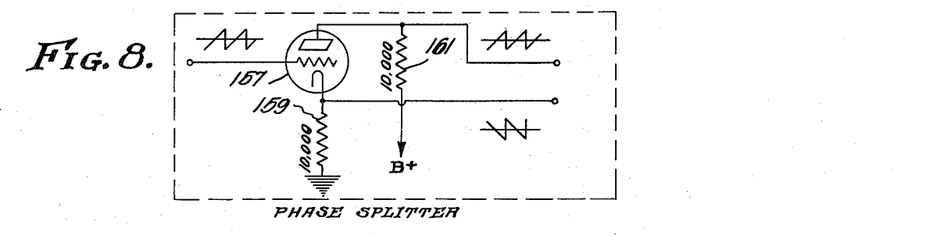
Figure 8 is the circuit of a phase splitter.

Fig. 8 illustrates a phase splitter, and comprises a thermionic tube 157 the output voltage of which is divided between the anode and cathode circuits; that is, resistors 159 and 161 of equal impedance are connected in the cathode and anode circuits of the tube, respectively, balanced output being taken from the anode and cathode electrodes.

Figure 10:
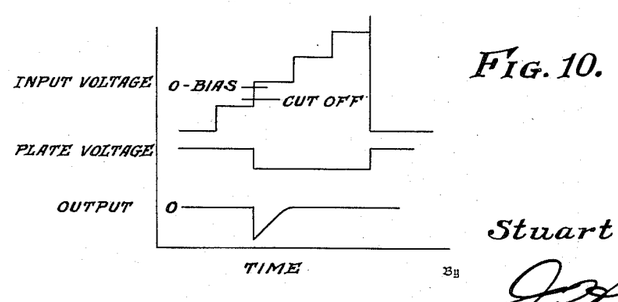
Figure 10 is a diagram illustrating the operation of the step selector of Fig. 9.

The pulse selector illustrated in Fig. 9 comprises a thermionic tube 163 which is provided with a potentiometer 165 for applying an adjustable positive voltage to its cathode. A series limiting resistor 167 may be included in the grid circuit. Output is taken from a capacitor 169 coupled to its anode. The amplitude of the applied step voltage is selected so that the increase for any given step exceeds the voltage necessary to cause the tube to pass from plate current cut-off to zero bias, as is indicated in Fig. 10; that is, the cut-off point for the tube is determined by adjustment of the potentiometer 165. This value is set to slightly exceed the maximum voltage for any given step, so that, when the voltage rises for the next succeeding step, the tube will draw a large plate current and its plate voltage will rapidly decrease to a substantially low value. It will be appreciated that, by adjusting the potentiometer 165, plate current may be made to flow at a time period corresponding to any desired one of the several steps. The output voltage of the pulse selector is also illustrated in Fig. 10, and is seen to be a differential voltage which becomes suddenly negative when the plate current increases, and the plate voltage decreases, and then slowly rises again to its steady state.

The output of the pulse selector is applied to a clipper tube which is illustrated in Fig. 11. This tube includes a grid limiting resistor 171 through which the negative pulse produced by the pulse selector is applied to a tube 173. The amplitude of the applied pulse is preferably sufficient to cause the grid voltage to exceed the cut-off value. As a result, the peak amplitude of the output voltage is limited in a manner illustrated in the small curve above the output terminal of Fig. 11. At the same time, the polarity of the pulse is inverted, so that the output of the clipper tube comprises a positive pulse of substantially rectangular form which starts at a time corresponding to the increase in voltage at the selected step and whose duration is sufficient to include a period up to but exclusive of the next succeeding step.

Figure 3:
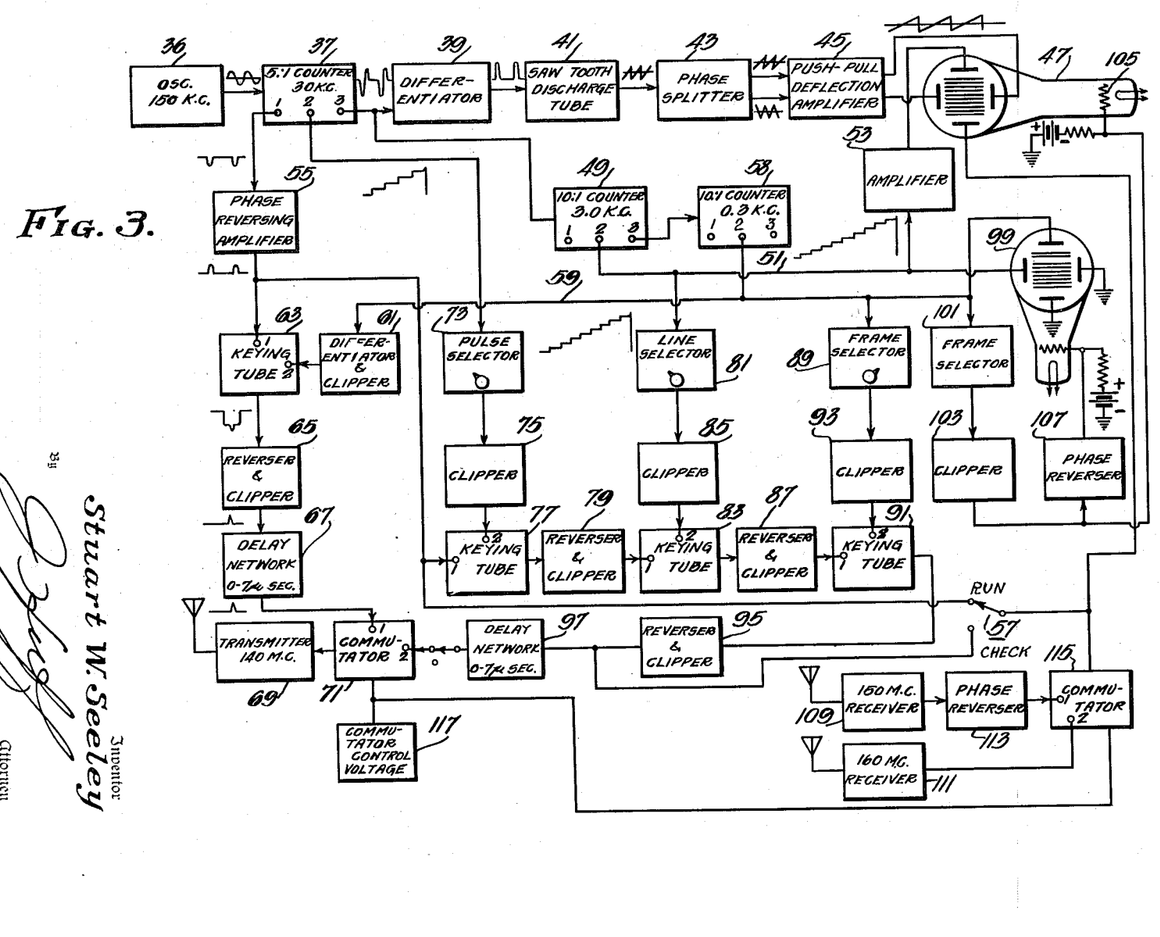
Figure 3 is a block diagram of the cathode ray indicator system which is provided in the aircraft.
Figure 12:
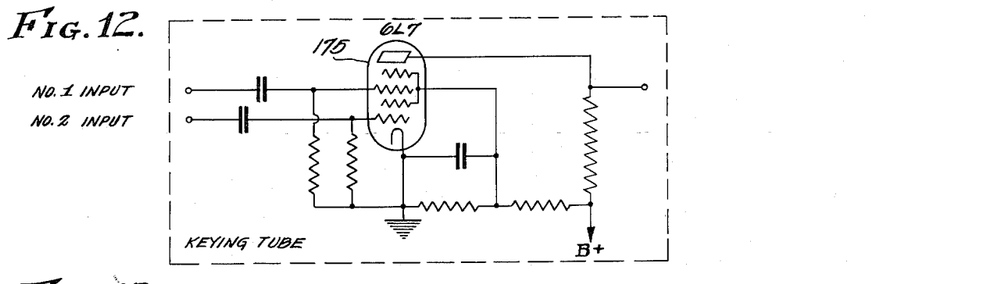
Figure 12 is the circuit diagram of a keying tube.
Figure 13:
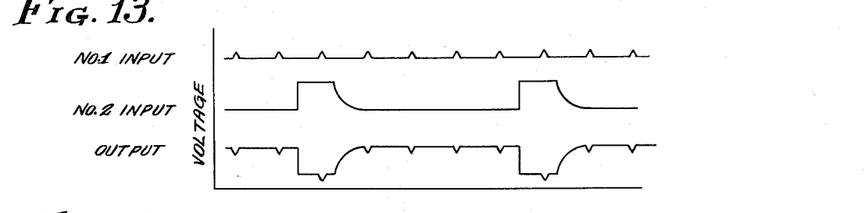
Figure 13 is a diagram illustrating the input and output voltages of the keying tube.

Referring for a moment to Fig. 3, it will be noted that the output of the clipper tube is applied to a keying tube which has two input terminals, the remaining terminal being energized by an indexing impulse corresponding to the original oscillator frequency. Such a keying tube is illustrated in Fig. 12, and the applied voltages are indicated in the sketch illustrated in Fig. 13 to which reference is now made. The keying tube, for example, is a tube 175 of the "6L7" type having a pair of grids which are connected respectively to the No. 1 input and the No. 2 input terminals. The output of the keying tube is derived from the plate circuit which is energized through a series impedance. In the absence of an applied grid voltage, the tube is biased to a substantially low value of plate current. Short impulses of the type produced by the No. 1 output of the counter tubes are applied to the No. 1 grid. The substantially rectangular impulse from the clipper tube is applied to the No. 2 grid. The resultant output voltage illustrated in Fig. 13 is a combination of the two input voltages and comprises a substantially rectangular negative output impulse having a small negative peak at its minimum point. This voltage is then applied to a phase reverser and clipper such as that illustrated in Fig. 14 and to which reference is now made.

The phase reversing section of this device includes a capacity-resistance coupled amplifier tube 177, the plate circuit of which is coupled to a biased amplifier tube 179 of the cathode follower type. Output is taken from the cathode across a cathode resistor 181, and a fixed positive bias is applied to the cathode by means of a potentiometer 183. As a result, the combined keying impulse and timing impulse A produced by the keying tube is inverted by the first amplifier tube 177 to produce a wave of the type illustrated at B in the small diagram of Fig. 14. The horizontal section of the keying impulse B corresponds to the cut-off bias of the output tube 179. This is accomplished by a suitably adjusted potentiometer 183. As a result, all the timing impulses, except that one which coincides with the keying impulse, are eliminated by the first reverser and clipper. In addition, the keying impulse itself is eliminated, since the output of the clipper tube responds only to potentials in excess of the peak potential of the keying voltage. As a result, a single impulse C is selected which corresponds in time with the impulse produced by the pulse selector.

Figure 15:
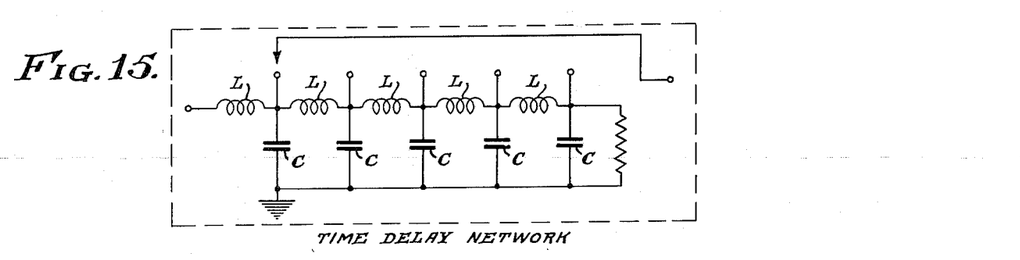
Figure 15 is the circuit diagram of a time delay network.

Fig. 15 represents an adjustable time delay network suitable for use in connection with this invention and comprises a series of inductors L and capacitors C connected in the well-known manner. The operation of this network is conventional and need not be described in detail.

Figure 16:
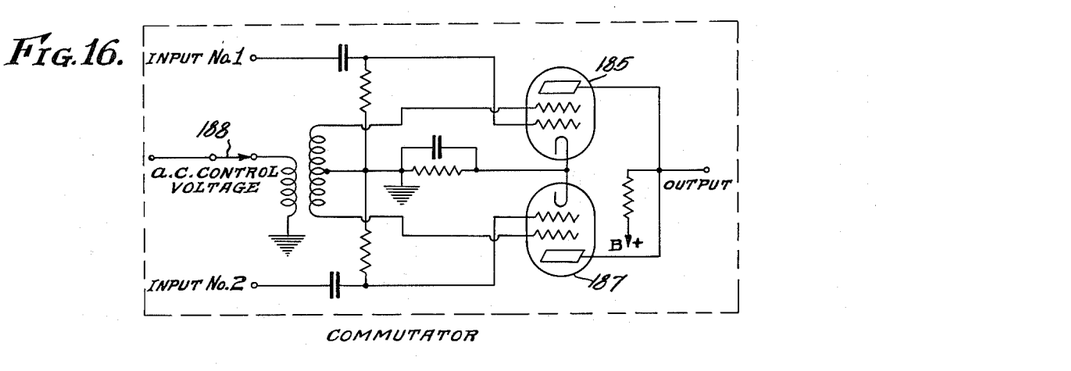
Figure 16 is the circuit diagram of a commutator.

Fig. 16 represents an electronic commutator suitable for use in connection with this invention. The commutator includes a pair of double grid thermionic tubes, of the 6L7 type, for example, 185 and 187. Input No. 1, from the delay network 67 of Fig. 3, for example, is coupled to one grid of the first tube 185. Input No. 2, from the delay network 97 of Fig. 3, for example, is connected to the corresponding grid of the second tube 187. An alternating voltage is applied in phase opposition from a suitable source of A.-C. voltage through a switch 188 in the remaining grids of the two tubes. The output anodes are connected in parallel and suitably energized by a source of positive potential. Operating the switch 188 removes the A.-C. control voltage so that both tubes are simultaneously operative, and the commutating action suspended.

In operation, the applied A.-C. control voltage causes the two tubes to become alternatively conductive so that the voltages applied to the respective input circuits are alternately amplified and connected to the output terminal.

Figure 17:
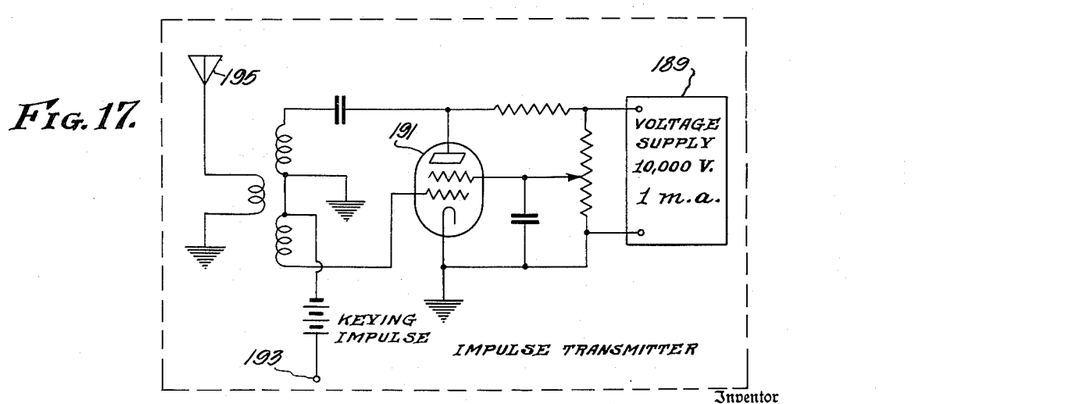
Figure 17 is the circuit diagram of an impulse transmitter.

Fig. 17 illustrates an impulse transmitter of the type suitable for use in connection with this invention. Since the radiated pulses are of extremely short duration, it is possible to operate the tube at a severe overload for such a short interval. A small tube may be utilized to radiate a pulse of large amplitude, since the tube is actually in operation only an extremely small portion of the total time. Consequently, a voltage supply source 189 is provided which supplies, for example, 10,000 volts at 1 m. a. This voltage is applied to the anode of an oscillator tube 191 which is connected in a conventional oscillator circuit. However, the oscillator grid is normally biased to cut-off so that the tube is inactive until such time as a suitable positive pulse is applied to its grid through input terminal 193. As a result, a short impulse of large amplitude is radiated from the antenna 195.

I claim as my invention:

1. The method of directing a movable object to a predetermined objective which is a known distance from two control stations which are at known locations, which comprises radiating pulses of radio energy from said movable object, receiving and reradiating said pulses at said control stations, receiving said reradiated pulses at said object, producing a first indication corresponding to the time period required for a pulse to travel from said predetermined objective to one of said control stations and back, producing a second indication corresponding to the time period required for a pulse to travel from said movable object to the other of said control stations and back, and comparing said first and second indications with a distance indication which is a time function of said known distance to determine when said object has reached said predetermined objective.

2. In the guiding of a movable object to a predetermined point which is a known distance from two control stations having known locations, the method which comprises radiating pulses of radio energy from said movable object, receiving and reradiating said pulses at said control stations, receiving said reradiated pulses at said object, producing one indication corresponding to the time period required for a pulse to travel from said predetermined objective to one of said control stations and back, producing another indication corresponding to the time period required for a pulse to travel from said movable object to the other of said control stations and back, producing as a function of time a third indication corresponding to said known distance, and utilizing said first and second indications by comparison with said third indication to determine when said object has reached said predetermined point.

3. In the guiding of a movable object to a predetermined point which is a known distance from a control station at a known location, the method which includes radiating successive short pulses of radio frequency energy from said movable object, receiving and reradiating said pulses at said control station, receiving said reradiated pulses at said object, the time length of said pulses being small with respect to the time required for each pulse to travel from and to said object, and the interval between successive pulses being greater than said time so that each pulse is radiated and received before the next succeeding pulse is radiated, producing as a function of time one indication corresponding to the calculated time period required for a pulse to travel from said predetermined point to said control station and back, producing a second indication corresponding to the time period required for a pulse to travel from said movable object to said control station and back, the relative displacement of said first and second indications being a measure of the distance of said object from said predetermined objective.

4. In the guiding of a movable object to a predetermined point which is a known distance from two control stations at known locations, the method which includes radiating successive short pulses of radio frequency energy from said movable object, receiving and reradiating said pulses at said control stations, receiving said reradiated pulses at said object, the time length of said pulses being small with respect to the time required for each pulse to travel from and to said object, and the interval between successive pulses being greater than said time so that each pulse is radiated and received before the next succeeding pulse is radiated, producing as a function of time an objective index corresponding to the time period required for a pulse to travel from said predetermined objective to the most distant control station, timing the transmission of the second of said successive radiated pulses with respect to the first radiated pulse to compensate for differences in distance between said objective and said two control stations, and utilizing said received reradiated pulses to produce position indexes corresponding to the time periods required for said pulses to travel from said object to respective control stations and back, the relative displacement of said objective index and said position indexes being a measure of the distance of said object from its objective.

5. The method of indicating the position of a movable object with respect to a predetermined objective the location of which is known with respect to the locations of a pair of control stations which comprises, radiating a first series of pulses of radio frequency energy from said object, receiving and reradiating said pulses at the control station furthest from said objective, radiating alternately pulses of a second series, receiving and reradiating said second series of pulses from the control station nearest said objective, the time period between corresponding pulses of said first and second series being equal to the difference in the time required for the pulses of said first and second series to travel from said objective to respective control stations and back, receiving said reradiated pulses at said object, producing an objective index corresponding to the time period required for a pulse to travel from said predetermined objective to said furthest control station, and utilizing said received pulses to produce position indexes corresponding to the position of the said object with respect to said control stations.

6. The method of indicating the position of a movable object with respect to a predetermined objective the location of which is known with respect to the location of a pair of control stations which comprises radiating a first series of pulses of radio frequency energy from said object, receiving and reradiating said pulses at the control station furthest from said objective, radiating alternately pulses of a second series, receiving and reradiating said second series of pulses from the control station nearest said objective, the time period between corresponding pulses of said first and second series being equal to the difference in the time required for the pulses of said first and second series to travel from said objective to respective control stations and back, receiving said reradiated pulses at said object, producing a cathode ray beam, deflecting said beam to produce a known time trace, producing on said trace an objective index, the position of which corresponds to the time distance from said objective to said furthest station and back, and utilizing said received pulses to produce position indexes on said trace, the position of said indexes corresponding to the instantaneous position of said object with respect to said control stations.

7. In the navigation of a movable object to a predetermined objective which is a known distance from two control stations, the method which includes radiating a succession of discrete pulses of radio frequency energy from said object, receiving and reradiating said pulses at said control stations, receiving said reradiated pulses at said object, establishing electrically in accordance with a time function an objective index corresponding to the calculated time for a pulse to travel from said objective to one of said control stations, and utilizing said received pulses to produce indications of the instantaneous time distance of said object from said control stations, whereby the distance of said object from its objective may be determined.

8. In a system for directing a movable object to a predetermined objective which is located at known distances from two control stations the combination of means for radiating a succession of pulses of radio frequency energy from said object, means located at each of said control stations for receiving and reradiating said pulses, means for separately receiving at said object the pulses reradiated from said two control stations, a cathode ray tube effectively connected to said receiving means and including ray deflecting means for producing a time measuring trace, and means including said cathode ray tube for measuring the time required for pulses transmitted from said object to be reradiated and returned to said object, and means for producing an objective index on said cathode ray trace, said index corresponding to the time interval required for a pulse to travel from the location of said objective to one of said control stations and back.

9. A system for indicating the position of a movable object with respect to a predetermined objective, said objective being a known distance from two control stations which includes means for radiating a pulse of radio frequency energy from said object, means located at said control stations for receiving and reradiating said pulse, means for separately receiving said reradiated pulses, time measuring means, means for producing predetermined timing indications on said time measuring means corresponding to the times required for a pulse to travel from the location of said objective to said control stations and back, and means for producing indications on said time measuring means corresponding to the time intervals required for a pulse to travel from said object to said control stations and back, the difference between corresponding indications being a measure of the distance of said object from its objective.

10. A system for directing a movable object to a predetermined objective which is located at known distances from a pair of control stations which includes in combination means for radiating a first series of pulses from said object, means for receiving and reradiating said pulses from one of said control stations, means for receiving said first series of reradiated pulses at said object, means for radiating a second series of pulses from said object, the pulses of said first and second series being radiated alternately, means for receiving and reradiating the pulses of said second series at the other of said control stations, means for receiving said second series of reradiated pulses at said object, indicating means responsive to said reradiated pulses and including said receiving means for producing position index marks corresponding to the times said reradiated pulses return to said object, and means for applying as a function of time an objective index mark on said indicating means, the arrival of said object at the location of said objective being determined by the coincidence of said objective mark and said position index marks.

11. A device of the character described in claim 10 in which the time period between corresponding pulses of said first and second series of pulses is equal to the difference in the time required for a pulse to travel from said objective to respective control stations and back to said objective.

12. A device of the character described in claim 10 in which said indicating means comprises a cathode ray tube having beam deflecting means for producing a line trace, the position of said index mark along said line trace being a measure of the relative time sequence of said marks.

13. A device of the character described in claim 10 in which said indicating means comprises a cathode ray tube having beam deflecting means for producing a plurality of separate linear traces, said traces being drawn in time sequence, the position of said index marks along said line traces being a measure of the time sequence of the reception of said reradiated pulses.

14. In a device of the character described, a movable object, means for radiating a succession of pulses of radio energy from said object, at least two control stations whose locations are known, means for receiving and reradiating from said control stations distinctive pulses received from said object, a cathode ray tube mounted in said object, scanning means for producing line traces on said cathode ray tube, and means connected to said cathode ray tube and separately responsive to the reception of said distinctive reradiated pulses for producing index marks on said traces, the positions of said index marks along said lines being measures of the transit time of said pulses.

15. A device of the character described in claim 14 which includes, in addition, means for producing as a function of time an objective index on one of said line traces, the position of said objective index being indicative of the destination of said object.

STUART W. SEELEY.